United States Patent
Kim et al.

(10) Patent No.: US 11,761,796 B2
(45) Date of Patent: Sep. 19, 2023

(54) APPARATUS FOR MEASURING POSITION IN A PIPE

(71) Applicant: RESEARCH COOPERATION FOUNDATION OF YEUNGNAM UNIVERSITY, Gyeongsangbuk-do (KR)

(72) Inventors: Gun Zung Kim, Daegu (KR); Yong Wan Park, Daegu (KR); Jeong Sook Eom, Gyeongsangbuk-do (KR)

(73) Assignee: RESEARCH COOPERATION FOUNDATION OF YEUNGNAM UNIVERSITY, Gyeongsangbuk-do (KR)

( * ) Notice: Subject to any disclaimer, the term of this patent is extended or adjusted under 35 U.S.C. 154(b) by 351 days.

(21) Appl. No.: 17/298,758

(22) PCT Filed: Dec. 29, 2020

(86) PCT No.: PCT/KR2020/019342
§ 371 (c)(1),
(2) Date: Jun. 1, 2021

(87) PCT Pub. No.: WO2022/145523
PCT Pub. Date: Jul. 7, 2022

(65) Prior Publication Data
US 2022/0404177 A1     Dec. 22, 2022

(30) Foreign Application Priority Data
Dec. 28, 2020   (KR) .......................... 10-2020-0184969

(51) Int. Cl.
*G01D 5/26*     (2006.01)
*G01C 21/14*    (2006.01)

(52) U.S. Cl.
CPC ............. *G01D 5/264* (2013.01); *G01C 21/14* (2013.01)

(58) Field of Classification Search
CPC ....... E21B 49/00; E21B 47/113; G01N 17/04; G01N 21/47; G01N 21/59; G01N 21/62
(Continued)

(56) References Cited

U.S. PATENT DOCUMENTS 7,612,878 B2 * 11/2009 Frey ........................ G01B 11/24
356/241.1
8,842,297 B2 * 9/2014 Storksen ............ G01B 11/0616
250/559.22
(Continued)

FOREIGN PATENT DOCUMENTS

KR      10-1258078 A      5/2013
KR      10-1936018 A      1/2019
(Continued)

OTHER PUBLICATIONS

Office action dated May 4, 2021 from Korean Patent Office in a counterpart Korean Patent Application No. 10-2020-0184969 (all the cited references are listed in this IDS.) (English translation is also submitted herewith.).
(Continued)

*Primary Examiner* — Isiaka O Akanbi
(74) *Attorney, Agent, or Firm* — The PL Law Group, PLLC (57) ABSTRACT

An apparatus for measuring a position according to an embodiment includes a light source emitting light to an inner surface of a pipe, a first lens receiving reflected light from which light emitted by the light source is reflected by the inner surface and converting the reflected light into parallel light parallel to an optical axis, a second lens disposed on an optical path of the parallel light and converting the parallel
(Continued)

light into a convergent refracted light, an image sensor disposed on an optical path of the refracted light, one or more elastic members disposed between the first lens and the second lens, and a plurality of wheels that are coupled to a side surface of the first lens and are in close contact with the inner surface to be rotated by movement of the moving body.

9 Claims, 7 Drawing Sheets

(58) Field of Classification Search
USPC .............. 356/614–624, 437, 445–448, 241.6
See application file for complete search history.

(56) References Cited

U.S. PATENT DOCUMENTS

| | | | | |
|---|---|---|---|---|
| 9,176,052 | B2* | 11/2015 | Tunheim | .............. G01N 21/954 |
| 9,696,143 | B2* | 7/2017 | Lefebvre | ................ G01B 11/12 |
| 11,029,257 | B2* | 6/2021 | Kueny | ................. G01N 21/954 |
| 2003/0198374 | A1* | 10/2003 | Hagene | ................ G01N 21/954 |
| | | | | 382/141 |
| 2006/0266134 | A1* | 11/2006 | MacMillan | ............. F16L 55/30 |
| | | | | 73/865.8 |
| 2019/0200823 | A1 | 7/2019 | Song et al. | |

FOREIGN PATENT DOCUMENTS

| | | |
|---|---|---|
| KR | 10-1945508 B1 | 2/2019 |
| KR | 10-2020-0123360 A | 10/2020 |

OTHER PUBLICATIONS

Notice of Allowance dated Aug. 23, 2021 from Korean Patent Office in a counterpart Korean Patent Application No. 10-2020-0184969 (all the cited references are listed in this IDS.) (English translation is also submitted herewith.).

* cited by examiner

APPARATUS FOR MEASURING POSITION IN A PIPE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/019342, filed Dec. 29, 2020, which claims priority to the benefit of Korean Patent Application No. 10-2020-0184969 filed in the Korean Intellectual Property Office on Dec. 28, 2020, the entire contents of which are incorporated herein by reference.

BACKGROUND

1. Technical Field

Embodiments disclosed in the present disclosure relate to a technique for measuring a position of a moving body moving inside a pipe.

2. Background Art

Apparatuses operating inside pipes where GPS signals do not reach use self-contained navigation to estimate their current position. Dead reckoning, which is mainly used for self-contained navigation, uses an inertial navigation system, which is a navigation system for calculating a position relative to an initial position based on a moving distance, a moving direction, or the like, determined using an encoder-type odometer, compass, gyroscope, acceleration sensor, or the like, mainly attached to the moving body.

The encoder-type odometer measures the movement of a wheel in close contact with the pipe to calculate a moving distance; however, errors may occur due to wheel slippage occurring when the moving body changes directions, the attitude of the moving body, the shape of the pipe, irregularities on the inner surface of the pipe, welding parts, pipe contact parts and areas, wheel wear and circumference measurement errors, odometer tooth resolution, or the like.

Meanwhile, an optical engine-type odometer using a pipe surface image generated by an image sensor is a non-contact type odometer, which shows the best performance in terms of reliability, restrictions in use, the amount of calculation for position estimation, or the like. The optical engine-type odometer acquires an image of the inner surface of a pipe with the image sensor, and then measures a moving distance and a moving direction by using a motion vector detected between successive images. In the optical engine-type odometer, wheel slippage and wear, which are the biggest cause of error of the encoder-type odometer, do not occur; however, a moving distance estimation error occurs due to a change in the distance between the image sensor and the inner surface of the pipe caused by irregularities or the like while the moving body is traveling.

SUMMARY

Embodiments disclosed in the present disclosure are to provide an apparatus for measuring a position of a moving body moving inside a pipe.

An apparatus for measuring a position according to an embodiment includes a light source emitting light to an inner surface of a pipe, a first lens receiving reflected light from which light emitted by the light source is reflected by the inner surface and converting the reflected light into parallel light parallel to an optical axis, a second lens disposed on an optical path of the parallel light and converting the parallel light into a convergent refracted light, an image sensor disposed on an optical path of the refracted light, one or more elastic members disposed between the first lens and the second lens, and a plurality of wheels that are coupled to a side surface of the first lens and are in close contact with the inner surface to be rotated by movement of the moving body.

The one or more elastic members may be compressed or relaxed by a force applied to at least one of the plurality of wheels on the inner surface with the movement of the moving body.

A distance between the first lens and a second lens may vary depending on the compression or relaxation of the one or more elastic members, and a distance between the inner surface and the first lens and a distance between the second lens and the image sensor may be invariant with respect to the compression or relaxation of the one or more elastic members.

The apparatus may further include a first body portion accommodating the first lens and the one or more elastic members, and a second body portion accommodating the second lens and the image sensor.

One end of each of the one or more elastic members may be fixed on an inner side of the first body portion, and the other end of each of the one or more elastic members may move in a direction parallel to the optical axis with movement of the first lens by the force applied to the at least one of the plurality of wheels.

The apparatus may further include one or more force-torque sensors measuring a force applied to each of the one or more elastic members.

The first lens may be a telecentric lens.

The second lens may be a convex lens for converging the parallel light to a focal point between the second lens and the image sensor.

Each of the plurality of wheels may be a wheel encoder.

According to the disclosed embodiments, an image of a certain size may be imaged on the imaging surface of an image sensor regardless of the distance between the image sensor and the inner surface of the pipe, and thus it is possible to minimize errors that may occur due to irregularities in the pipe when the position of a moving body is measured by using the image of the inner surface of the pipe generated by the image sensor.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
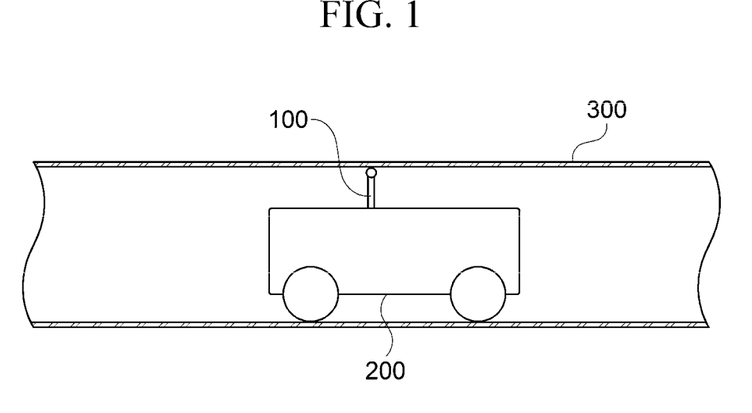
FIG. 1 is a view exemplarily illustrating a moving body equipped with a position measuring apparatus according to an embodiment.

FIG. 1 is a view exemplarily illustrating a moving body equipped with a position measuring apparatus according to an embodiment.

Referring to FIG. 1, a moving body 200 according to an embodiment includes a position measuring apparatus 100 on one side, and is a device configured to move inside a pipe 300. In this case, the pipe 300 may be, for example, a pipe in which a gas pipe, a water supply pipe, and a cable such as a communication cable is embedded, but is not necessarily limited to a pipe for a specific purpose.

Meanwhile, according to an embodiment, the moving body 200 is for cleaning or inspecting the inside of the pipe 300 while moving inside the pipe 300, and may be, for example, a mobile robot configured to move inside the pipe with an independent power source therein or by using power provided by an external power source. However, the moving body 200 is not necessarily limited to the mobile robot, and as long as it can move inside the pipe 300, it is not necessarily limited to a specific type or purpose device.

Figure 2:
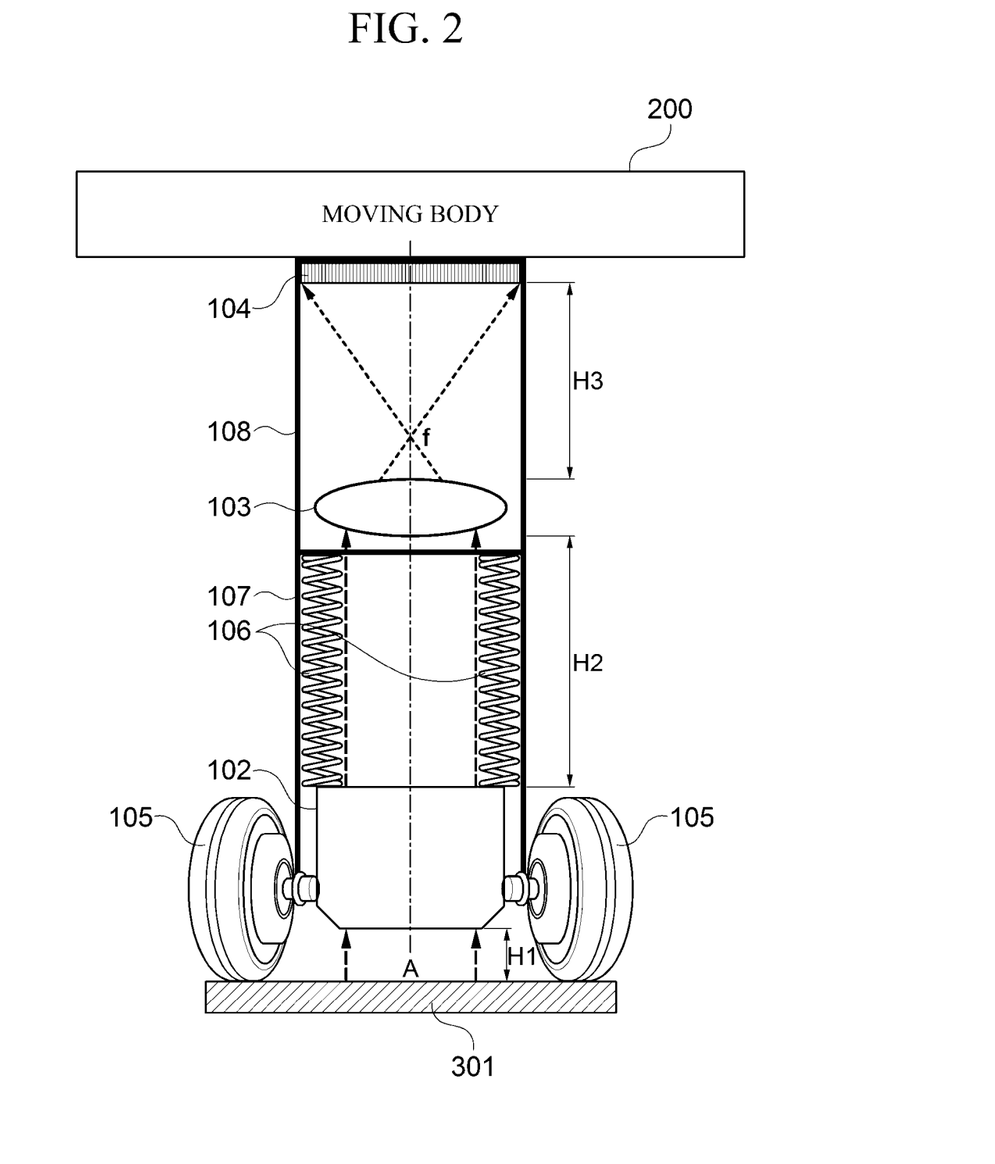
FIG. 2 is a view showing a structure of a position measuring apparatus (100) according to a first embodiment.
Figure 3:
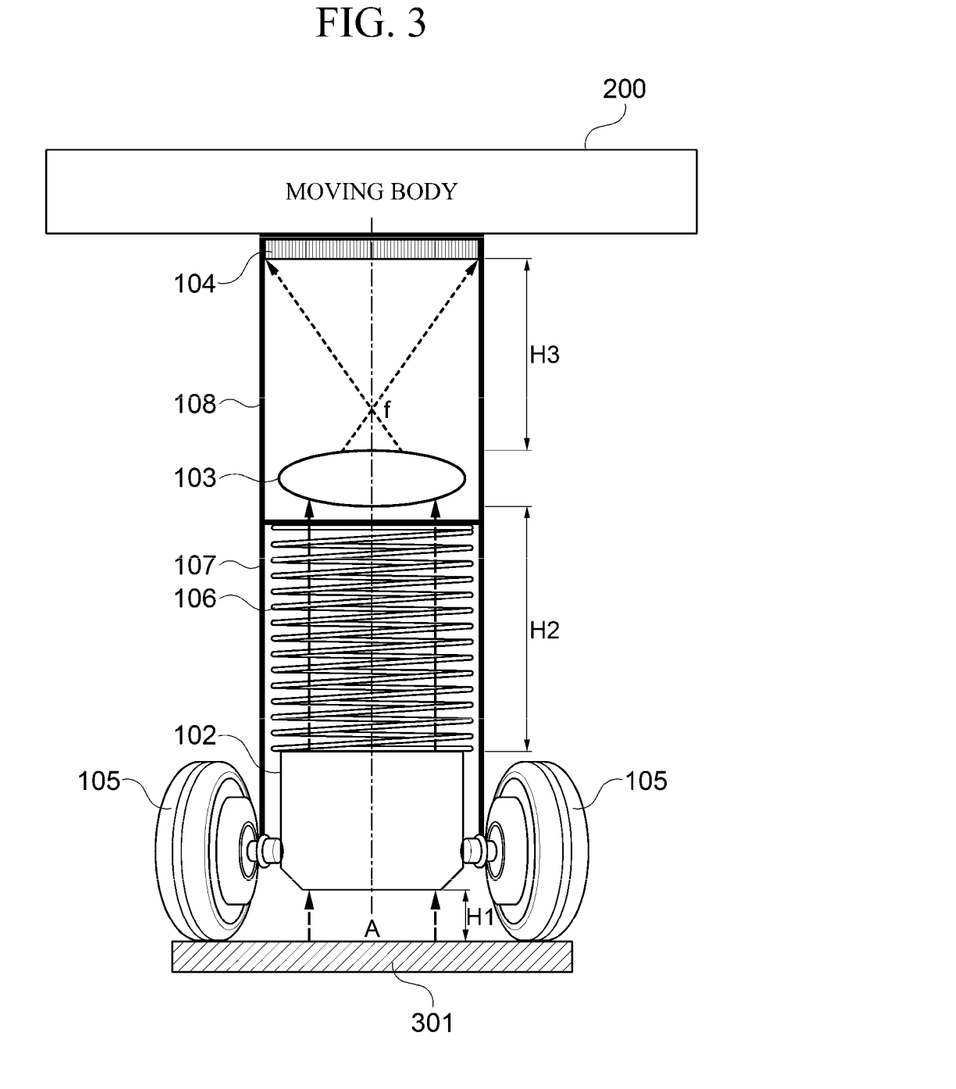
FIG. 3 is a view showing a structure of a position measuring apparatus (100) according to a second embodiment.
Figure 4:
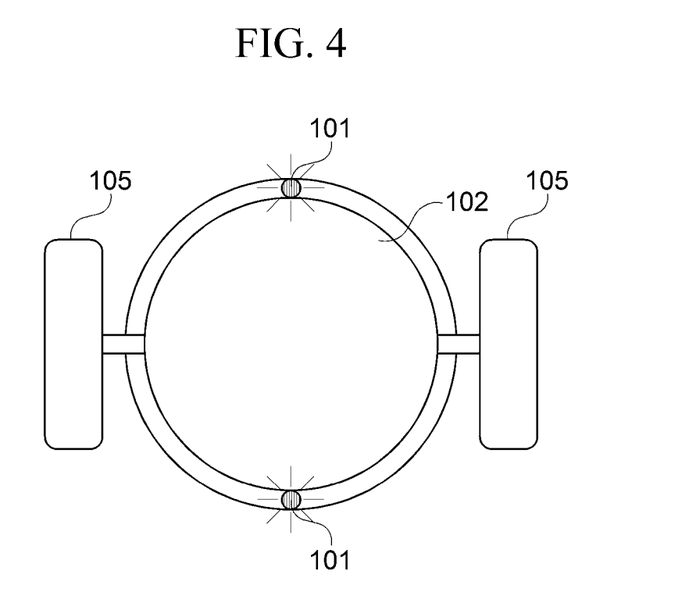
FIG. 4 is a view showing a cross-section of the position measuring apparatus (100) shown in FIG. 1 or FIG. 2 when viewed from an inner surface (301) of a pipe (300).

FIG. 2 is a view showing a structure of a position measuring apparatus 100 according to a first embodiment, FIG. 3 is a view showing a structure of a position measuring apparatus 100 according to a second embodiment, and FIG. 4 is a view showing a cross-section of the position measuring apparatus 100 shown in FIG. 1 or FIG. 2 when viewed from an inner surface 301 of the pipe 300.

Referring to FIGS. 2 to 4, the position measuring apparatus 100 includes one or more light sources 101, a first lens 102, a second lens 103, an image sensor 104, and a plurality of wheels 105, one or more elastic members 106, a first body portion 107, and a second body portion 108.

One or more light sources 101 emit light toward the inner surface 301 of the pipe 300.

According to an embodiment, the one or more light sources 101 may be disposed around an incident surface of the first lens 102 as shown in FIG. 3 and configured to emit light toward the inner surface 301 of the pipe 300. However, the position where the one or more light sources 101 are disposed and the number of the one or more light sources 101 are not necessarily limited to the example shown in FIG. 3 and may vary depending on embodiments.

In addition, according to an embodiment, the one or more light sources 101 may be, for example, light emitting diodes (LEDs), but are not necessarily limited to a specific type of light source.

The first lens 102 converts reflected light, which the light emitted by one or more light sources 101 is reflected from the inner surface 301 of the pipe 300 and is incident thereon, into parallel light parallel to an optical axis A and emits the parallel light.

According to an embodiment, the first lens 102 may be, for example, a telecentric lens in which an entrance pupil is located at an infinite distance, such as a telecentric f-theta lens.

The second lens 103 is disposed on an optical path of parallel light emitted from the first lens 102, converts the parallel light emitted from the first lens 102 into convergent refracted light and emits it.

According to an embodiment, the second lens 103 may be, for example, a lens having a positive refractive power, such as a convex lens.

Specifically, the parallel light emitted from the first lens 102 is incident on the second lens 103, and the parallel light incident on the second lens 103 is converted into refracted light that converges at a focal point f between the second lens 103 and the image sensor 104 to be imaged on the imaging surface of the image sensor 104.

The image sensor 104 is disposed on an optical path of the refracted light emitted from the second lens 103, and converts the refracted light emitted from the second lens 103 and imaged on the imaging surface of the image sensor 104 into an electrical signal, thereby generating an image corresponding to the inner surface 301 of the pipe 300.

According to an embodiment, the image sensor 104 may be, for example, a charged coupled device (CCD) sensor or a complementary metal oxide semiconductor (CMOS) sensor, but is not necessarily limited to a specific type of image sensor.

Each of the plurality of wheels 105 is coupled to a side surface of the first lens 102 and is in close contact with the inner surface 301 of the pipe 300 to be rotated by the movement of the moving body 200.

Specifically, the plurality of wheels 105 may be a pair of wheels coupled to opposite side surfaces of the first lens 102.

Meanwhile, the plurality of wheels 105 are configured to be in close contact with the inner surface 301 of the pipe 300 by the force of one or more elastic members 106 pushing the first lens 102 and be rotated around a rotation axis perpendicular to the optical axis A with the movement of the moving body 200.

The one or more elastic members 106 are each disposed between the first lens 102 and the second lens 103.

According to an embodiment, the one or more elastic members 106 may be, for example, an elastic body having elasticity such as a compression spring, but are not necessarily limited to a specific type of elastic body.

The first body portion 107 accommodates the first lens 102 and the one or more elastic members 106.

In this case, each of the elastic members 106 is disposed such that one end thereof is fixed to an inner side of the first body portion 107 and the other end moves in a direction parallel to the optical axis A with the movement of the first lens 102. That is, each of the elastic members 106 is compressed or relaxed as the first lens 102 moves in the direction parallel to the optical axis A.

Figure 5:
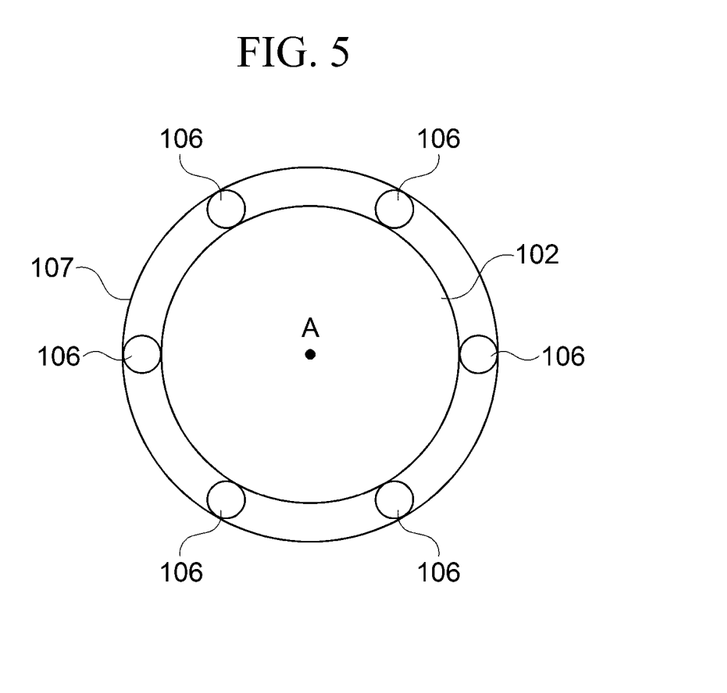
FIG. 5 is a view showing an example of a cross-section of a first body portion (107) of the position measuring apparatus (100) according to the first embodiment shown in FIG. 1 when cut in a direction perpendicular to an optical axis (A).

Meanwhile, FIG. 5 is a view showing an example of a cross-section of the first body portion 107 of the position measuring apparatus 100 according to the first embodiment shown in FIG. 1 when cut in a direction perpendicular to the optical axis A.

As in the example shown in FIG. 5, a plurality of elastic members 106 may be accommodated in the first body portion 107, and each of the elastic members 106 may be disposed at certain intervals along the edge of an emission surface of the first lens 102 so as not to invade the optical path of the parallel light emitted from the first lens 102.

Figure 6:
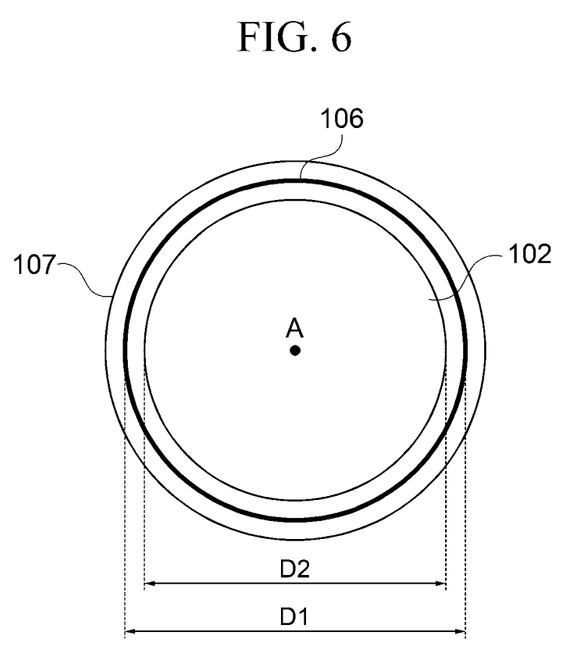
FIG. 6 is a view showing an example of a cross-section of a first body portion (107) of the position measuring apparatus (100) according to the second embodiment shown in FIG. 2 when cut in a direction perpendicular to an optical axis (A).

FIG. 6 is a view showing an example of a cross-section of the first body portion 107 of the position measuring apparatus 100 according to the second embodiment shown in FIG. 2 when cut in a direction perpendicular to an optical axis A.

One elastic member 106 may be accommodated in the first body portion 107 as in the example shown in FIG. 6. In this case, the elastic member 106 may be a compression spring in the form of a coil of which an inner diameter D1 is greater than a diameter D2 of the emission surface of the first lens 102 so as not to invade the optical path of the parallel light emitted from the first lens 102.

The second body portion 108 accommodates the second lens 103 and the image sensor 104 therein. Specifically, the second lens 103 and the image sensor 104 may be disposed in the second body portion 108 such that a distance H3 on the optical axis A is fixed to a constant value.

Meanwhile, an opening may be formed between the first body portion 107 and the second body portion 108 in a direction perpendicular to the optical axis A, through which parallel light emitted from the first lens 102 may be incident on the second lens 103.

Meanwhile, when the moving body 200 moves along a curved path inside the pipe 300 or crosses the irregularities existing inside the pipe 300, the force acting from the moving body 200 in the direction of the inner surface 301 of the pipe 300 may fluctuate, and accordingly, the force acting on the plurality of wheels 105 at the inner surface 301 of the pipe 300 also fluctuates. In this case, the force acting on the plurality of wheels 105 is transmitted to one or more elastic members 106 through the first lens 102 to which the plurality of wheels 105 are coupled. Thereby, the one or more elastic members 106 are compressed or relaxed to change the length of the one or more elastic members 106 in the direction of the optical axis A, and as a result, the first lens 102 moves along the optical axis A inside the first body portion 107.

That is, a distance H1 between the inner surface 301 of the pipe 300 and the first lens 102 and a distance H3 between the second lens 103 and the image sensor 104 are maintained in a fixed state; however, a distance H2 between the first lens 102 and the second lens 103 is changed according to compression or relaxation of one or more elastic members 106.

However, as described above, the light emitted from the first lens 102 and incident on the second lens 103 is parallel light parallel to the optical axis A, and thus when the distance H1 with the first lens 102 and the distance H3 between the second lens 103 and the image sensor 104 are maintained in the fixed state, the size of the image to be imaged on the imaging surface of the image sensor 104 does not change even if the distance H2 between the first lens 102 and the second lens 103 changes. Therefore, the image sensor 104 generates an image of the same size regardless of the change in the distance between the moving body 200 and the inner surface 301 of the pipe 300.

Meanwhile, according to an embodiment, the position of the moving body 200 may be determined based on the image generated by the image sensor 104. For example, the position of the moving body 200 may be determined depending on a moving distance and a moving direction of the moving body 200 determined based on a motion vector extracted from each of images continuously generated by the image sensor 104. In this case, as described above, the size of the image to be imaged on the imaging surface of the image sensor 104 is maintained regardless of the change in the distance between the image sensor 104 and the surface of the pipe 300, and thus an error that may occur due to the change in the size of the image when the moving distance and the moving direction of the moving body 200 are determined may be minimized.

Meanwhile, according to an embodiment, the plurality of wheels 105 may be wheel encoders. In this case, the position of the moving body 200 may be determined based on the moving distance and the moving direction measured based on the image and the moving distance measured by the wheel encoder.

Figure 7:
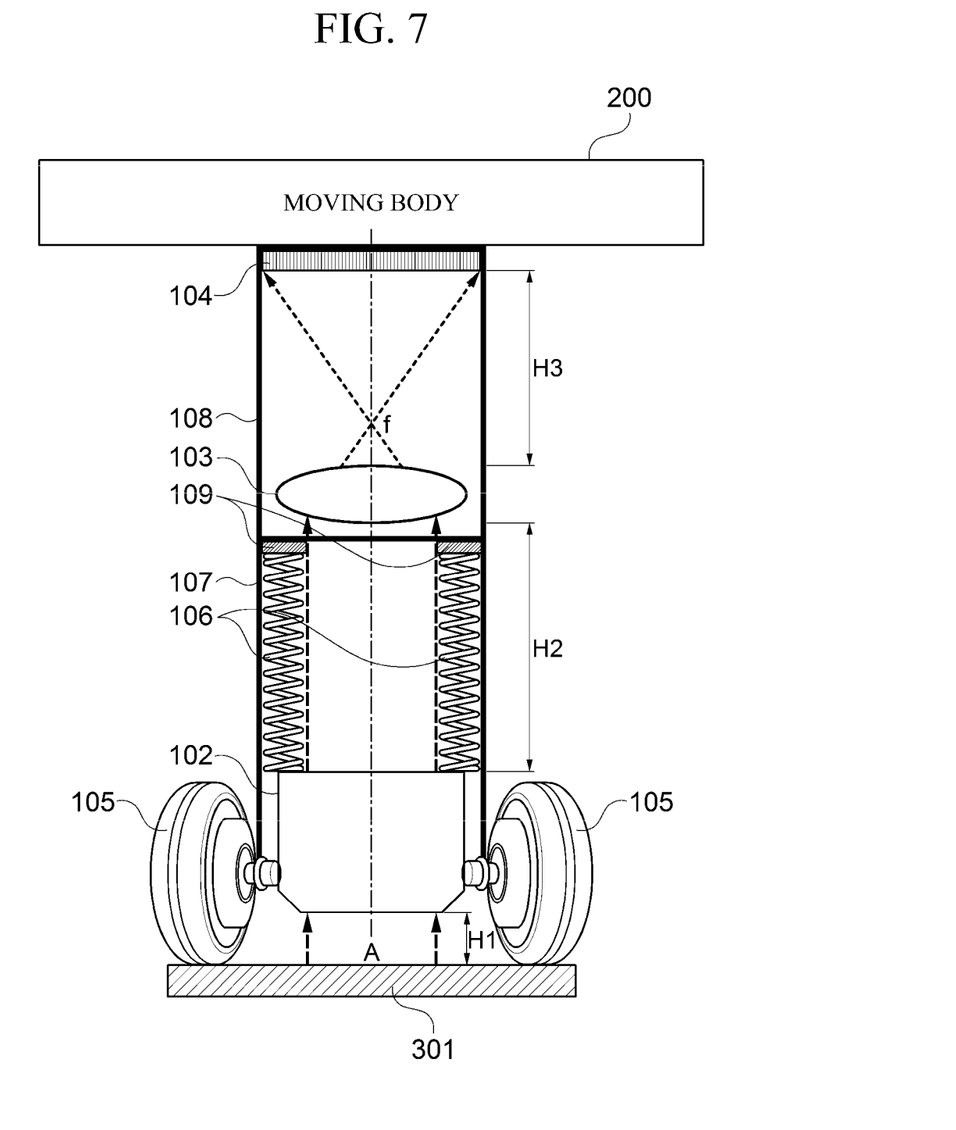
FIG. 7 is a view showing a structure of a position measuring apparatus (100) according to a third embodiment.
Figure 8:
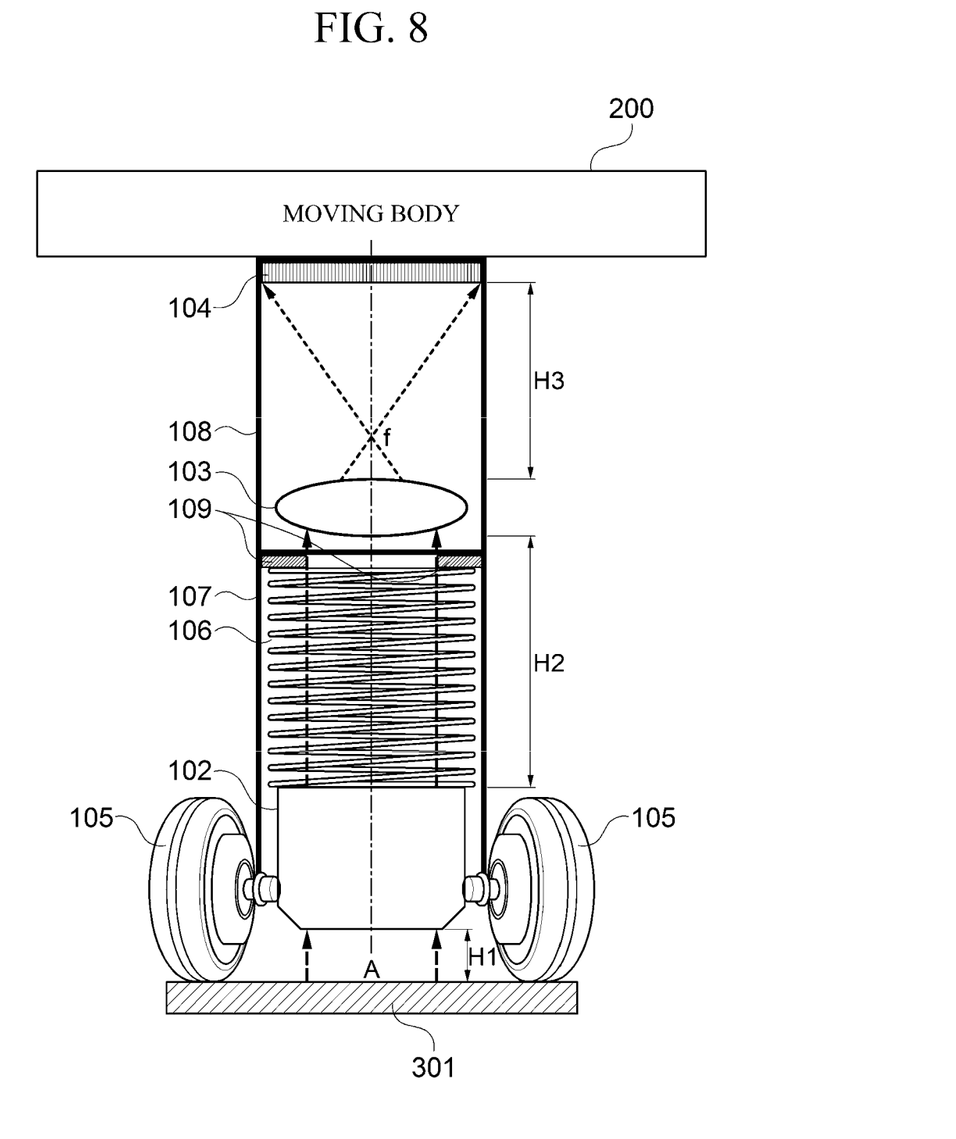
FIG. 8 is a view showing a structure of a position measuring apparatus (100) according to a fourth embodiment.

FIG. 7 is a view showing a structure of a position measuring apparatus 100 according to a third embodiment, and FIG. 8 is a view showing a structure of a position measuring apparatus 100 according to a fourth embodiment.

As in the example shown in FIGS. 7 and 8, the position measuring apparatus 100 may further include one or more force-torque sensors 109 that measure the force applied to the one or more elastic members 106.

Specifically, the one or more force-torque sensors 109 may be disposed between an inner side of the first body portion 109 and the one or more elastic members 106, respectively, to measure the force applied to each of the one or more elastic members 106 with the change in the distance between the moving body 200 and the inner surface 301 of the pipe 300.

Meanwhile, according to an embodiment, the value measured by each of the force-torque sensors 109 may be used for calculating the distance between the moving body 200 and the inner surface 301 of the pipe 300. In addition, when a plurality of force-torque sensors 109 are disposed, various information related to the inner shape of the pipe 300 or the wear degree of each of the plurality of wheels 105 may be generated based on the difference in the magnitude of the force measured by each of the force-torque sensors 109.

For example, when there are irregularities inside the pipe 300, the magnitude of the force applied to each of the plurality of wheels 105 when the moving body 200 passes the irregularities varies depending on the height, width and position of the irregularities. In this case, since the force applied to each of the one or more elastic members 106 also varies depending on the difference in the force applied to each wheel 105, it is possible to estimate the position, height, and area of the irregularities based on the change and magnitude difference in the force measured by each of the force-torque sensors 109.

Although the present invention has been described in detail through the representative embodiments as above, those skilled in the art will understand that various modifications may be made thereto without departing from the scope of the present invention. Therefore, the scope of rights of the present disclosure should not be limited to the described embodiments, but should be defined not only by the claims set forth below but also by equivalents of the claims.

What is claimed is:

1. An apparatus for measuring a position provided in a moving body moving inside a pipe, the apparatus comprising:
   a light source emitting light to an inner surface of the pipe;
   a first lens receiving reflected light from which light emitted by the light source is reflected by the inner surface and converting the reflected light into parallel light parallel to an optical axis;
   a second lens disposed on an optical path of the parallel light and converting the parallel light into a convergent refracted light;
   an image sensor disposed on an optical path of the refracted light;
   one or more elastic members disposed between the first lens and the second lens; and
   a plurality of wheels that are coupled to a side surface of the first lens and are in close contact with the inner surface to be rotated by movement of the moving body.

2. The apparatus of claim 1, wherein the one or more elastic members are compressed or relaxed by a force applied to at least one of the plurality of wheels on the inner surface with the movement of the moving body.

3. The apparatus of claim 2, wherein a distance between the first lens and the second lens varies depending on the compression or relaxation of the one or more elastic members, and
   a distance between the inner surface and the first lens and a distance between the second lens and the image sensor are invariant with respect to the compression or relaxation of the one or more elastic members.

4. The apparatus of claim 3, further comprising:
   a first body portion accommodating the first lens and the one or more elastic members; and
   a second body portion accommodating the second lens and the image sensor.

5. The apparatus of claim 4, wherein one end of each of the one or more elastic members is fixed on an inner side of the first body portion; and
   the other end of each of the one or more elastic members moves in a direction parallel to the optical axis with movement of the first lens by the force applied to the at least one of the plurality of wheels.

6. The apparatus of claim 4, further comprising one or more force-torque sensors disposed between an inner side of the first body portion and the one or more elastic members, respectively, to measure a force applied to each of the one or more elastic members.

7. The apparatus of claim 1, wherein the first lens is a telecentric lens.

8. The apparatus of claim 1, wherein the second lens is a convex lens for converging the parallel light to a focal point between the second lens and the image sensor.

9. The apparatus of claim 1, wherein each of the plurality of wheels is a wheel encoder.

* * * * *